(12) United States Patent
Harmening et al.

(10) Patent No.: US 12,496,574 B2
(45) Date of Patent: Dec. 16, 2025

(54) RARE-EARTH PHOSPHATE ALUMINA COMPOSITE FOR USE IN EMISSION CONTROL CATALYSTS AND METHOD FOR MAKING THE SAME

(71) Applicant: Sasol Germany GmbH, Hamburg (DE)

(72) Inventors: Thomas Harmening, Munster (DE); Marcos Schoneborn, Hamburg (DE); Johanna Fabian, Brunsbuttel (DE)

( * ) Notice: Subject to any disclaimer, the term of this patent is extended or adjusted under 35 U.S.C. 154(b) by 0 days.

(21) Appl. No.: 16/964,710

(22) PCT Filed: Feb. 20, 2019

(86) PCT No.: PCT/EP2019/054249
§ 371 (c)(1),
(2) Date: Jul. 24, 2020

(87) PCT Pub. No.: WO2019/162349
PCT Pub. Date: Aug. 29, 2019

(65) Prior Publication Data
US 2020/0346194 A1 Nov. 5, 2020

(30) Foreign Application Priority Data
Feb. 21, 2018 (EP) .................... 18157927

(51) Int. Cl.
| | | |
|---|---|---|
| B01J 21/04 | (2006.01) | |
| B01J 27/18 | (2006.01) | |
| B01J 35/61 | (2024.01) | |
| B01J 35/63 | (2024.01) | |
| B01J 37/02 | (2006.01) | |
| B01J 37/04 | (2006.01) | |
| B01J 37/08 | (2006.01) | |
| B01D 53/94 | (2006.01) | |
| B01J 35/45 | (2024.01) | |
| B01J 35/77 | (2024.01) | |

(52) U.S. Cl.
CPC .......... B01J 27/1804 (2013.01); B01J 21/04 (2013.01); B01J 35/613 (2024.01); B01J 35/633 (2024.01); B01J 35/635 (2024.01); B01J 37/0209 (2013.01); B01J 37/04 (2013.01); B01J 37/086 (2013.01); B01J 37/088 (2013.01); B01D 53/945 (2013.01); B01D 2255/1021 (2013.01); B01D 2255/1023 (2013.01); B01D 2255/1025 (2013.01); B01J 35/45 (2024.01); B01J 35/77 (2024.01)

(58) Field of Classification Search
None
See application file for complete search history.

(56) References Cited

U.S. PATENT DOCUMENTS

2005/0265920 A1\* 12/2005 Ercan .................... B01J 23/002
502/302

FOREIGN PATENT DOCUMENTS

| CN | 107159278 | 9/2017 |
|---|---|---|
| EP | 2754489 | 7/2014 |
| GB | 1431868 | 4/1976 |
| JP | 5511043 | 1/1980 |
| JP | 2014100684 | 6/2014 |

OTHER PUBLICATIONS

Nguyen et al. Applied Catalysis A, General 549 (2018)170-178 (Year: 2018).*
Millet et. al., Applied Catalysis B: Environmental 166-167 (2015)432-444 (Year: 2015).*
Khalaf, Hussein, The negative effect of ceria on the propene selectivity for isopropanol decomposition over phosphated and phosphate-free ceria/alumina catalysts, Springerplus, vol. 2, No. 1, 2013.
Machida, et al., Tuning the electron density of Rh supported on metal phosphates for three-way catalysis, J. Phys. Chem. C2015, 119, 11653-11661.
Ozawa, "Thermal Stabilization of Catalytic Compositions for Automobile Exhaust Treatment Through Rare Earth Modification of Alumina Nanoparticle Support", J. of Alloys & Compounds, 408-412, p. 1090-1095 (2006).
Wasay, et al., "Removal of Hazardous Anions from Aqueous Solutions by La(III)- and Y(III)-Impregnated Alumina", Separation Sci. and Tech., 31(10), p. 1501-1514 (1996).

\* cited by examiner

*Primary Examiner* — Yun Qian
(74) *Attorney, Agent, or Firm* — Werner IP Law, P.C

(57) ABSTRACT

The present invention relates to a composition for use in a catalyst system in emission control systems comprising a transition alumina based material and rare earth phosphates and to a method for making same.

9 Claims, 2 Drawing Sheets

RARE-EARTH PHOSPHATE ALUMINA COMPOSITE FOR USE IN EMISSION CONTROL CATALYSTS AND METHOD FOR MAKING THE SAME

INTRODUCTION

The present invention relates to a composition for use in a catalyst system in emission control systems comprising a transition alumina based material and rare earth phosphate and to a method for making same.

BACKGROUND

In the state of the art, in emission control catalysts, three-way catalyst systems (hereinafter "TWC") including a noble metal such as Platinum (Pt), Palladium (Pd) or Rhodium (Rh), a carrier such as alumina, ceria, zirconia, a ceria-zirconia complex oxide, and a catalyst support which is made of ceramic or metallic materials. Rhodium acts as a very important active component in these TWC systems mainly for converting harmful NOx to $N_2$. It is well known that Rhodium supported on alumina tends to deactivate under lean-conditions by an irreversible reaction with $Al_2O_3$ forming a catalytically inactive rhodium-aluminate. There is therefore a need for enhancing the thermal stability of the supported Rhodium. By thermal stability (or thermostability) is meant the ability of a substance to resist irreversible changes in its chemical and/or physical structure, e.g. by resisting one or more of decomposition, sintering, chemical altering or phase transformation, at a relatively high temperature.

Various solutions have been provided by the prior art, for example use of $ZrO_2$ as a support material for the Rhodium. However, due to stricter legislations and more challenging thermal stress requirements there is a need for improved supports for Rhodium-based washcoats. An improvement was proposed by M. Machida et al.: "Tuning the Electron Density of Rh Supported on Metal Phosphates for Three-Way Catalysis", J. Phys. Chem. C 2015, 119, 11653-11661, in which the use of rare-earth phosphates to be used as a support material for Rhodium in TWC is described. However, a problem with the use of these bulk rare-earth phosphates as supports is that the Rhodium does not disperse well on the support.

There is therefore a need to improve these systems.

SUMMARY OF THE INVENTION

According to one aspect of the invention there is provided a composition for use as a support in a catalyst system comprising:
  i) a transition alumina based material; and
  ii) a rare-earth phosphate, the rare earth phosphate being characterized by having a crystallite size that is lower than 50 nm, preferably lower than 15 nm and most preferably lower than 10 nm, after calcination at 1000° C. for 3 hours.

By transition alumina is meant all aluminas in a transition state between boehmite and alpha alumina.

According to a further aspect of the invention there is provided a method to prepare the above composition for use as a support in a catalyst system the method comprising:
  i) providing a transition alumina rare earth oxide material wherein the transition alumina rare earth oxide material is prepared by a method comprising the following steps:
    a) preparing a suspension including a transition alumina precursor;
    b) preparing an aqueous solution including a rare earth salt (the rare earth salt solution);
    c) combining the suspension with the rare earth salt solution to form an alumina rare earth salt mixture;
    d) drying the alumina rare earth salt mixture to form a dried alumina rare earth salt mixture; and
    e) calcining the dried alumina rare earth oxide salt mixture to form the transition alumina rare earth oxide material;
  ii) impregnating the transition alumina rare earth oxide material with an aqueous solution containing phosphate-ions to form an impregnated transition alumina rare earth oxide material; and
  iii) calcining the impregnated transition alumina rare earth oxide material.

DETAILED DESCRIPTION OF THE INVENTION

The composition comprises a transition alumina based material and a rare earth phosphate.

The transition alumina based material comprises transition alumina and most preferably transition alumina derived from boehmite, transition alumina derived from silica-alumina, transition alumina derived from doped alumina or derived from mixtures thereof. By doped alumina is meant alumina doped with alkaline earth oxides, $ZrO_2$, rare-earth oxides or $TiO_2$, each in the range of from 0.1 wt. % to 20 wt. %, preferably from 1 wt. % to 5 wt. %, or mixtures thereof. The transition alumina based material is preferably transition alumina derived from boehmite.

By transition alumina is meant all aluminas in a transition state between boehmite and alpha alumina.

According to one embodiment of the invention the composition includes at least 50 wt. % of the transition alumina based material, preferably at least 60% wt. % of the transition alumina based material and most preferably 70 wt. % of the transition alumina based material.

The transition alumina based material may have a specific surface area between 50 $m^2/g$ and 300 $m^2/g$ and a pore volume of between 0.1 ml/g and 1.5 ml/g.

The specific surface area as provided herein is measured by BET using Nitrogen according to DIN-ISO 9277. The pore volume and the pore size distribution was measured using the method proposed by Barrett, Joyner and Halenda (BJH) using nitrogen adsorption at 77 K.

The rare-earth phosphate is preferably $LaPO_4$, $YPO_4$ or $NdPO_4$, and more preferably $LaPO_4$.

According to one embodiment of the invention the composition includes between 3 and 50 wt. % of the rare earth phosphate preferably between 10 and 30 wt. % of the rare earth phosphate, more preferably 5 and 30 wt. % of the rare earth phosphate, each calculated as the corresponding rare-earth oxide.

The rare earth phosphate preferably has a crystallite size that is lower than 15 nm after calcination at 1000° C. for 3 hours, and most preferably a crystallite size that is lower than 10 nm after calcination at 1000° C. for 3 hours.

The crystallite size is determined by the Scherrer method, using the (21-2) reflection (indexing based on the monoclinic monazite structure, ICSD Reference Code: 98-007-9747) in the X-ray powder diffraction pattern of the composition after a thermal treatment at 1000° C. for 3 hours under air in the case of La and Nd phosphates and by the Scherrer method, using the (020) reflection (indexing based on the tetragonal zircon structure, ICSD Reference Code: 98-002-4514) in the X-ray powder diffraction pattern of the composition after a thermal treatment at 1000° C. for 3 hours under air in the case of Y phosphate.

The rare-earth phosphate is preferably homogenously dispersed in the matrix of the transition alumina based material. Without being bound by theory the Applicant believes that a homogenous dispersion of the small rare-earth phosphate crystals enables the transition alumina matrix to act as a diffusion barrier leading to beneficial properties of the composite. The homogeneity is measured by scanning-electron-microscope (SEM) cross-section imaging, optionally together with EDX element mapping revealing the domain sizes of the transition alumina based material and the rare-earth phosphate.

The composition of the present invention preferably has a BET specific surface area of at least 50 m$^2$/g, preferably between 70 m$^2$/g and 150 m$^2$/g and a pore volume between 0.2 ml/g and 1.2 ml/g, preferably between 0.3 ml/g and 1.0 ml/g. These measurements were taken as described above.

According to a second aspect of the invention there is provided a method to prepare a composition for use as a support in a catalyst system the method comprising:
i) providing an alumina rare earth oxide material wherein the transition alumina rare earth oxide material is prepared by a method comprising the following steps:
   a) preparing a suspension including a transition alumina precursor;
   b) preparing an aqueous solution including a rare earth salt;
   c) combining the suspension with the rare earth salt solution to form an alumina rare-earth salt mixture;
   d) drying the alumina rare earth salt mixture to form a dried alumina rare earth salt mixture; and
   e) calcining the dried alumina rare earth oxide salt mixture to form the transition alumina rare earth oxide material;
ii) impregnating the alumina rare earth oxide material with an aqueous solution containing phosphate-ions to form an impregnated alumina rare earth oxide material; and
iii) calcining the impregnated alumina rare earth oxide material.

Phosphate ions may comprise or in other words may originate from phosphoric acid, orthophosphates, hydrogenphosphates, dihydrogenphosphates, diphosphates, triphosphates, metaphosphates, pentaphosphates, polyphosphates or mixtures thereof.

The transition alumina precursor preferably includes alumina hydrates of general formulas Al(OH)$_3$ and/or AlOOH*xH$_2$O or mixtures thereof. The alumina precursor is preferably boehmite. The alumina precursor may further comprise silica, titanium dioxide, water soluble salts of alkaline earth metals, zirconium or mixtures thereof. The alumina precursor preferably comprises at least 50 wt. % alumina hydrates of the general formulas Al(OH)$_3$ and AlOOH*xH$_2$O or mixtures thereof.

The suspension including a transition alumina precursor is preferably a boehmite suspension prepared by hydrolysis of an Al-alkoxide.

The suspension including a transition alumina precursor preferably includes the alumina precursor and at least water in a ratio of 2:98 to 20:80. The suspension may further include pH modifying additives for example carboxylic acid or ammonia, preferably mono-carboxylic acids such as acetic acid.

The rare-earth salt is a water-soluble salt, preferably a rare earth acetate, more preferably La acetate, Y acetate, Nd acetate or mixtures thereof and more preferably La acetate.

The rare earth salt solution preferably includes the rare earth salt and water corresponding to a rare-earth oxide content of 2 to 20 wt. % in the solution. The suspension may further include pH modifying additives for example carboxylic acid or ammonia.

The alumina rare-earth salt mixture preferably includes at least 50 wt. % of the transition alumina precursor, preferably at least 60 wt. % of the transition alumina precursor and most preferably 70 wt. % of the transition alumina precursor.

The alumina rare-earth salt mixture preferably includes between 3 and 50 wt. % of a rare earth salt, preferably between 10 and 30 wt. % of a rare earth salt, more preferably 5 and 30 wt. % of the rare earth salt calculated as the corresponding rare-earth oxide.

The alumina rare earth salt mixture is preferably spray dried.

The dried alumina rare earth salt mixture is then calcined preferably at a temperature of between 450 to 1200° C. for a period of 0.5 to 5 hours to form a transition alumina rare earth oxide material.

Impregnation of the transition alumina rare earth oxide material may be carried out by any impregnation method known in the art. Preferably the well-known incipient wetness impregnation method is used by preferably filling 80-100% of the pore volume of the alumina rare earth oxide material with an aqueous solution containing phosphate-ions, preferably a phosphoric acid. Preferably the solution is used for impregnation up to an amount that provides a molar ratio of phosphoric acid to the rare-earth element between 10 and 100 mol %. For example, if the rare-earth element is La and if the ratio is 100 mol % there is an equimolar amount of La and PO$_4^{3-}$ and there is only LaPO$_4$ on the transition alumina. If the ratio is 10 mol % there is only 10 mol % LaPO$_4$ and 90 mol % La as oxide on the transition alumina.

The impregnated transition alumina rare earth oxide material is then calcined preferably at a temperature of 600 to 1100° C., preferably at 900 to 1100° C. and most preferably 1000° C. Calcination may run for a period of between 0.5 and 5 hours, preferably 3 hours.

The thermostability of the composition of the present invention may be determined by calcining the composition for 3 hours at 1200° C. After calcining the composition for 3 hours at 1200° C., the composition is preferably characterized by one or more of the following:
the composition has a BET specific surface area of at least 40 m$^2$/g, preferably between 45 m$^2$/g and 90 m$^2$/g;
the composition has a pore volume between 0.3 ml/g and 1.0 ml/g, preferably between 0.4 ml/g and 0.9 ml/g,
wherein the BET specific surface area and pore volume measurements were carried out as described above.

The invention will now be described with reference to the non-limiting examples and Figures in which.

EXAMPLES

Figure 1:
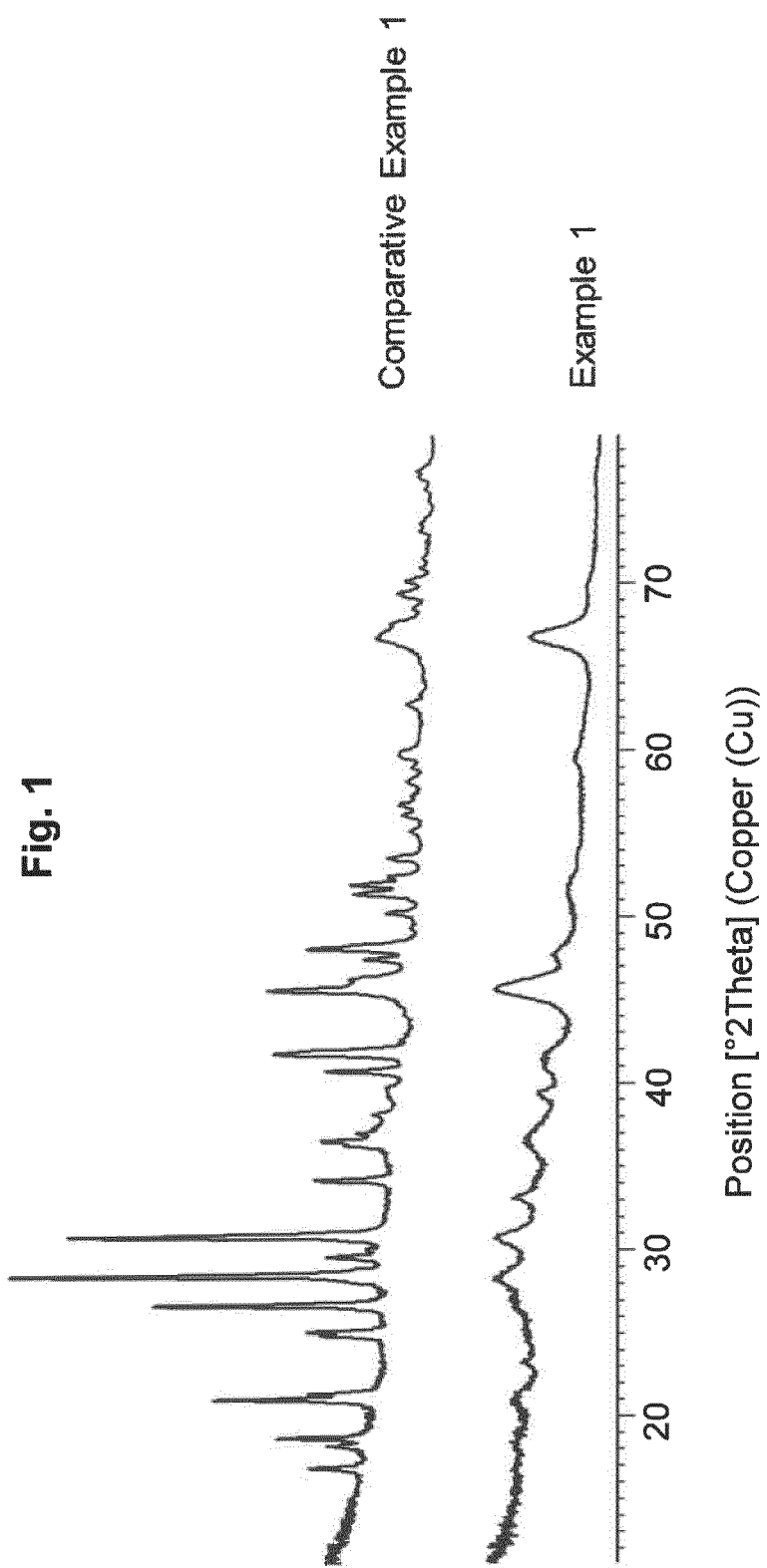
FIG. 1 is a powder XRD of the composition obtained in Example 1 compared to Comparative Example 1 showing the difference in crystallinity of LaPO$_4$.

The crystallite size is determined by the Scherrer method as described above.

The Surface area is measured by BET and the pore volume by $N_2$ adsorption as described above.

EXPERIMENTS

Example 1

A transition alumina rare earth oxide material made of 20 wt. % lanthanum oxide containing transition alumina having a specific surface area (BET) of 130 $m^2/g$ and a pore volume of 0.97 ml/g was impregnated with an aqueous solution of phosphoric acid (14.4 wt. % $H_3PO_4$). The product was dried at 120° C. and finally calcined at 1000° C. for 3 hours.

Example 2

A transition alumina, rare earth oxide material made of 20 wt. % yttrium oxide containing transition alumina having a specific surface area (BET) of 134 $m^2/g$ and a pore volume of 0.98 ml/g was impregnated with an aqueous solution of phosphoric acid (13.2 wt. % $H_3PO_4$). The product was dried at 120° C. and finally calcined at 1000° C. for 3 hours.

Example 3

A transition alumina, rare earth oxide material made of 20 wt. % neodymium oxide containing transition alumina having a specific surface area (BET) of 130 $m^2/g$ and a pore volume of 0.97 ml/g was impregnated with an aqueous solution of phosphoric acid (14.4 wt. % $H_3PO_4$). The product was dried at 120° C. and finally calcined at 1000° C. for 3 hours.

Example 4

A transition alumina, rare earth oxide material made of 15 wt. % lanthanum oxide containing transition alumina having a specific surface area (BET) of 145 $m^2/g$ and a pore volume of 0.94 ml/g was impregnated with an aqueous solution of phosphoric acid (9.7 wt. % $H_3PO_4$). The product was dried at 120° C. and finally calcined at 1000° C. for 3 hours.

Comparative Example 1

$LaPO_4$ was prepared according to Example 3 from EP 2754489 A1:
Phosphoric acid solution was added a to Lanthanum nitrate solution in an amount yielding a 1:1 molar ratio of La and P. A pH value of 8 was adjusted by the addition of ammonia solution. The precipitate was separated by filtration and finally calcined at 900° C. for 5 hours.

The $LaPO_4$ obtained was combined with alumina. The $LaPO_4$ powder and a 4 wt. % lanthanum doped alumina having a specific surface area (BET) of 151 $m^2/g$ and a pore volume of 1.02 ml/g were made into a slurry and wet milled. Then the suspension was spray dried and calcined at 1000° C. for 3 hours to obtain the comparative composite.

Comparative Example 2

$CePO_4$ was prepared according to Example 6 of GB 1431868 by evaporating $(NH_4)_2Ce(NO_3)_6$ on aluminum oxide, using commercially available PURALOX TH100/150, and heating to 400° C. overnight. Then phosphoric acid was added to the cooled mixture. After calcination for 3 h at 1000° C. the comparative product was tested and no $CePO_4$ was found; only $AlPO_4$ was found. The specific surface area (BET) of the comparative product was 45 $m^2/g$.

The Results are included in Table 1 hereunder:

TABLE 1

| | Example 1 | Example 2 | Example 3 | Example 4 | Comparative Example 1 | Comparative Example 2 |
|---|---|---|---|---|---|---|
| Rare-earth phosphate | $LaPO_4$ | $YPO_4$ | $NdPO_4$ | $LaPO_4$ | $LaPO_4$ | ($CePO_4$) |
| Content | 26 wt. % | 26 wt. % | 26 wt. % | 18 wt. % | 26 wt. % | n/a |
| Crystallite* size (nm) | 8 | 10 | 7 | 8 | 64 | n/a - no $CePO_4$ found, only $AlPO_4$ |
| BET* ($m^2/g$) | 95 | 106 | 114 | 97 | 83 | 45 |
| Pore Volume* (ml/g) | 0.6 | 0.84 | 0.77 | 0.84 | 0.64 | 0.34 |
| Crystallite** size (nm) | | | | 11 | 84 | |
| BET** ($m^2/g$) | | | | 59 | 53 | |
| Pore Volume** (ml/g) | | | | 0.56 | 0.37 | |

*as is
**after additional calcination for 3 h at 1200° C. (for thermostability)

FIG. 1 shows the XRD pattern of materials obtained in Example 1 and Comparative Example 1. The difference in crystallinity of $LaPO_4$ is clearly revealed by the width of the diffraction lines. The values extracted by the Scherrer method are listed in Table 1.

Figure 2:
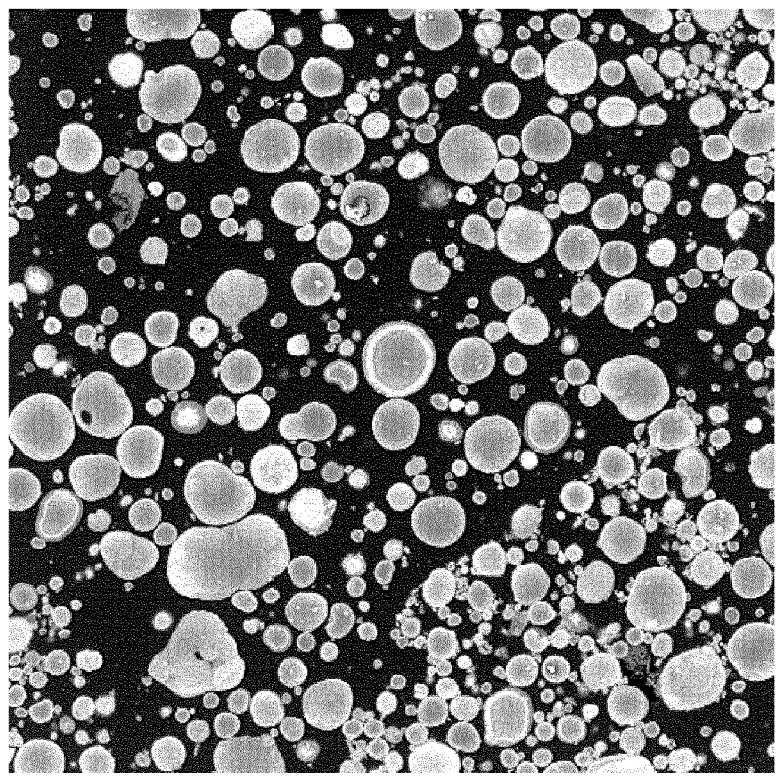
FIG. 2 (inventive material) is an SEM of Example 1 and shows homogeneous white spots.
Figure 3:
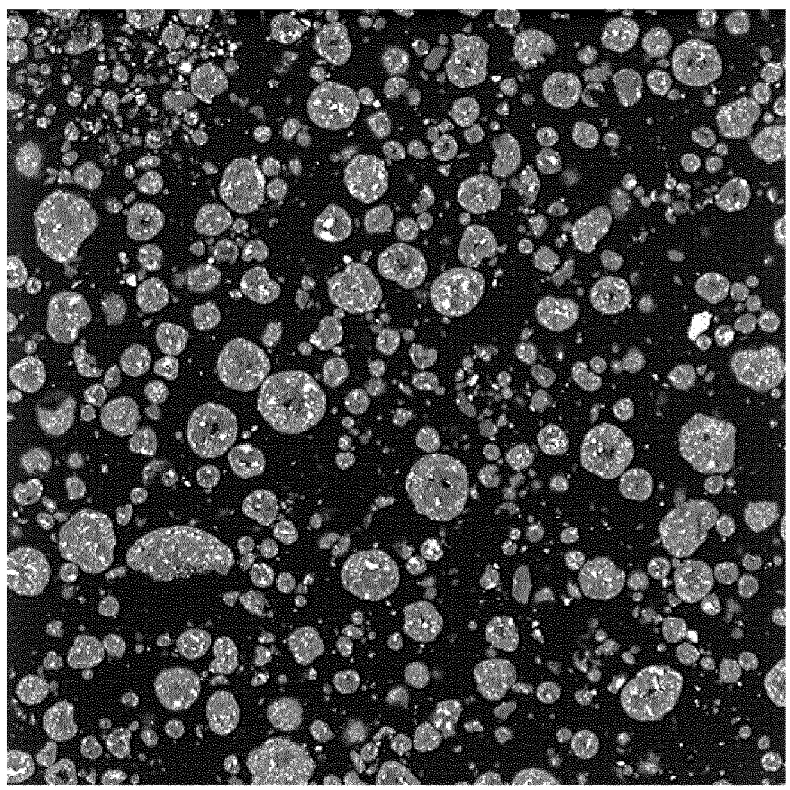
FIG. 3 is an SEM of Comparative Example 1 and shows white spots in a grey matrix, which means that there are RE rich (white area) and Al rich domains (grey area).

Further, the SEM cross-section pictures in FIGS. 2 and 3 show the materials obtained in Example 1 (FIG. 2) and Comparative Example 1 (FIG. 3). To be noted is the difference in homogeneity of the 2 samples by the appearance of well-defined white spots corresponding to $LaPO_4$ rich areas indicating a lower homogeneity.

The invention claimed is:

1. A composition for use as a support in a catalyst system comprising:
   i) a transition alumina; and
   ii) a rare-earth phosphate consisting of $LaPO_4$, $YPO_4$, $NdPO_4$, or mixtures thereof, crystallites of the rare-earth phosphate being dispersed in a matrix of the transition alumina, the dispersed crystallites of the rare earth phosphate being characterized by having a crystallite size that is lower than 50 nm after calcination at 1000° C. for 3 hours.

2. The composition of claim 1 wherein at least 50 wt. % of the composition comprises transition alumina.

3. The composition of claim 1 wherein between 3 and 50 wt. % of the composition comprises rare earth phosphate.

4. The composition of claim 1, wherein the rare earth phosphate has a crystallite size that is lower than 15 nm after calcination at 1000° C. for 3 hours.

5. The composition of claim 1, wherein the rare earth phosphate has a crystallite size that is lower than 10 nm after calcination at 1000° C. for 3 hours.

6. The composition of claim 1 having a BET specific surface area of at least 50 m²/g.

7. The composition of claim 1 having a pore volume between 0.2 and 1.2 ml/g.

8. The composition of claim 1, wherein the transition alumina is derived from boehmite, silica-alumina, doped alumina, or mixtures thereof.

9. The composition of claim 8, wherein the doped alumina is doped with alkaline earth oxides, $ZrO_2$, rare-earth oxides or $TiO_2$.

* * * * *